(12) United States Patent
Miyashita et al.

(10) Patent No.: US 11,764,711 B2
(45) Date of Patent: Sep. 19, 2023

(54) MOTOR CONTROL APPARATUS AND IMAGE FORMING APPARATUS

(71) Applicant: CANON KABUSHIKI KAISHA, Tokyo (JP)

(72) Inventors: Takuya Miyashita, Kanagawa (JP); Eijiro Ohashi, Tokyo (JP); Yasukazu Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 17/340,551

(22) Filed: Jun. 7, 2021

(65) Prior Publication Data

US 2021/0408949 A1     Dec. 30, 2021

(30) Foreign Application Priority Data

Jun. 29, 2020   (JP) ................................. 2020-111908

(51) Int. Cl.
*H02P 6/18*        (2016.01)
*G03G 15/00*   (2006.01)

(52) U.S. Cl.
CPC ......... *H02P 6/186* (2013.01); *G03G 15/5008* (2013.01); *G03G 15/80* (2013.01)

(58) Field of Classification Search
CPC . H02P 6/186; H02P 6/185; H02P 6/24; G03G 15/5008; G03G 15/80

USPC .................. 318/811, 810, 807, 767, 727
See application file for complete search history.

(56) References Cited

U.S. PATENT DOCUMENTS 9,742,318 B2 *   8/2017   Clothier .................. H02P 6/085

FOREIGN PATENT DOCUMENTS

JP          2015-104263 A       6/2015

* cited by examiner

*Primary Examiner* — David Luo
(74) *Attorney, Agent, or Firm* — Canon U.S.A., Inc. I.P. Division

(57) ABSTRACT

A motor control apparatus includes an excitation unit and a control unit. The excitation unit includes switching elements connected to a power supply and to different motor coils. The excitation unit excites an excitation phase targeted for excitation among motor excitation phases by the control unit driving the switching elements. When the excitation phases are excited, the control unit drives, in a first time period and based on a first PWM signal, a first switching element connected to a first phase coil corresponding to a first phase of the excitation phase targeted for excitation and, in a second time period and based on a second PWM signal, drives a second switching element connected to a second phase coil corresponding to a second phase of the excitation phase. The control unit controls outputting a duty ratio of the second PWM signal to the second switching element in the second time period.

16 Claims, 11 Drawing Sheets

MOTOR CONTROL APPARATUS AND IMAGE FORMING APPARATUS

BACKGROUND

Field

The present disclosure relates to a motor control apparatus and an image forming apparatus.

Description of the Related Art

Motors such as a DC brushless motor, a brushed DC motor, and a stepping motor are used as the driving source for rotational members used in an image forming apparatus. A sensorless motor that does not have a Hall element for detecting a rotational position (rotational phase) of a rotor is also used as a DC brushless motor. With sensorless motors, in order to avoid issues such as loss of synchronism and inverted rotation which may occur when the motor is started, a rotor stop position is detected, and start processing is performed in accordance with the detected stop position. Japanese Patent Laid-Open No. 2015-104263 discloses a configuration for detecting a rotor stop position based on an exciting current in a case where a voltage is applied to coils of the motor for a short time.

By generating exciting currents in order in multiple coil combinations, and measuring the generated exciting currents, a rotor stop position determination (detection) can be performed based on the measurement results. In such a case, by starting measurement from a state in which the exciting current is 0, the rotor stop position determination accuracy is increased. Accordingly, when the exciting current attenuation rate is slow, the waiting time until the exciting current becomes 0 is longer, and as a result of the timing at which it is possible to start measurement being delayed, the time needed to determine the stop position of the rotor becomes longer.

Also, in the case of regenerating the exciting current into the power supply in order to cause the exciting current to attenuate in a short time, the power supply output voltage rises due to the energy of the regenerated exciting current. When a change occurs in the power supply output voltage while measuring the exciting current, in order, for the multiple combinations of coils, it results in reduced accuracy in determining the stop position of the rotor. Also, due to the waiting time until the rise in power supply output voltage converges, the time required to determine the stop position of the rotor becomes longer.

SUMMARY

The present disclosure provides a technique for shortening the time needed to determine the stop position of the rotor of a motor that is the target of control.

According to an aspect of the present disclosure, a motor control apparatus includes an excitation unit having a plurality of switching elements respectively connected to a power supply and respectively connected to different coils of a motor, wherein the excitation unit is configured to excite an excitation phase targeted for excitation among a plurality of excitation phases of the motor by the plurality of switching elements being driven, a measurement unit configured to measure an exciting current, that flows through a coil, of an excitation phase excited by the excitation unit, a determination unit configured to determine a stop position of a rotor of the motor, based on a result of measuring the exciting current by the measurement unit obtained by exciting the plurality of excitation phases, and a control unit configured to drive a switching element, wherein, when the plurality of excitation phases are excited, the control unit drives, in a first time period and in accordance with a first pulse width modulation (PWM) signal, a first switching element connected to a first phase coil corresponding to a first phase of the excitation phase targeted for excitation and, in a second time period after the first time period and in accordance with a second PWM signal, the control unit drives a second switching element connected to a second phase coil corresponding to a second phase of the excitation phase, and wherein, based on power supplied by the power supply, the control unit controls a duty ratio of the second PWM signal to be outputted to the second switching element in the second time period.

Further features of the present disclosure will become apparent from the following description of exemplary embodiments (with reference to the attached drawings).

DESCRIPTION OF THE EMBODIMENTS

Figure 1:
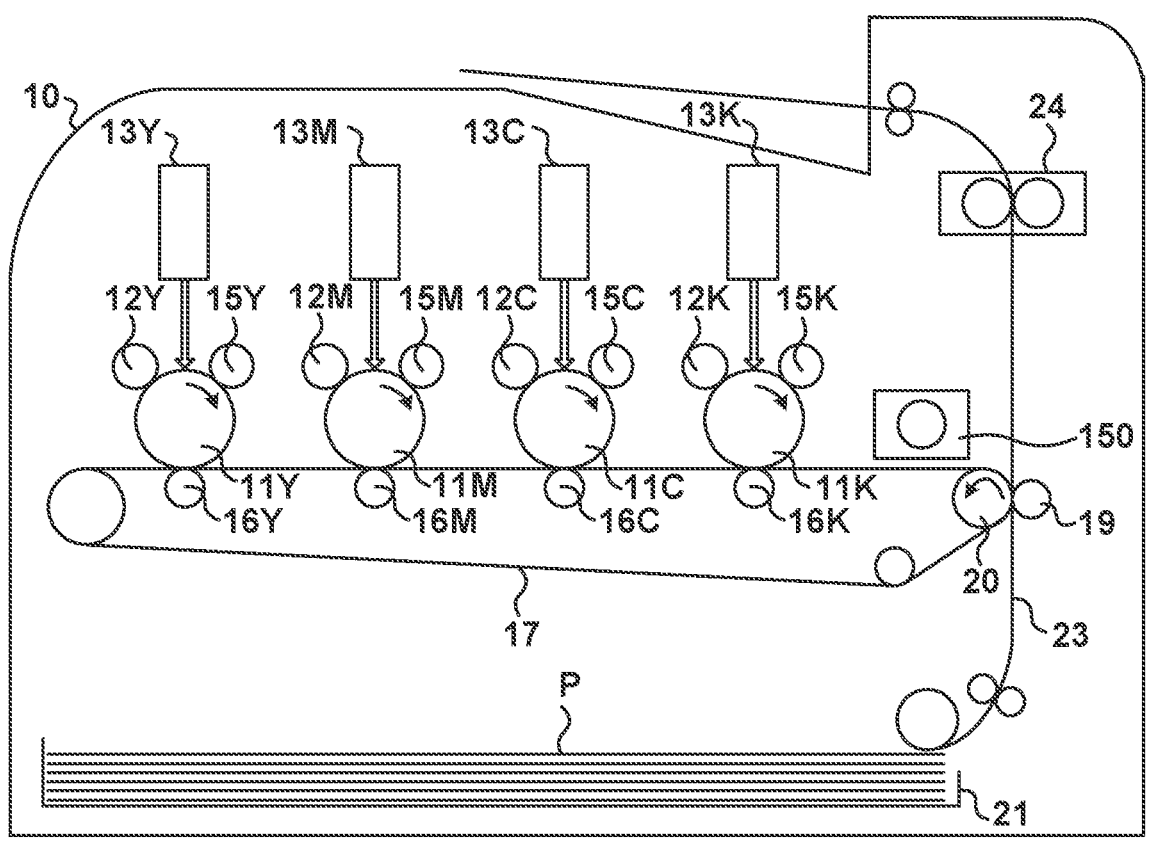
FIG. 1 is a cross-sectional view for illustrating an example of a hardware configuration of an image forming apparatus.

Hereinafter, embodiments will be described in detail with reference to the attached drawings. Note, the following embodiments are not intended to limit the scope of the disclosure. Multiple features are described in the embodiments, but limitation is not made to require all such features, and multiple such features may be combined as appropriate. Furthermore, in the attached drawings, the same reference numerals are given to the same or similar configurations, and redundant description thereof is omitted.

First Embodiment

In the first and second embodiments, a case where a motor control apparatus is arranged in an image forming apparatus such as a printing apparatus (printer), a copying machine, a multi-function device, or a facsimile apparatus will be described.

<Image Forming Apparatus>

FIG. 1 is a cross-sectional view for illustrating an example of a hardware configuration of an image forming apparatus according to the first present embodiment. An image forming apparatus 10 overlays toner images of four colors, namely yellow (Y), magenta (M), cyan (C), and black (K) to form a full-color image. In FIG. 1, Y, M, C and K at the ends of reference numerals indicate that the colors of toner images with which members denoted by the reference signs are involved when the toner images were formed are respectively yellow, magenta, cyan, and black. Note that, in the following description, when it is not necessary to distinguish colors, reference signs without Y, M, C and K at their ends are used.

The image forming apparatus 10 includes, for each color of a toner image of a formation target, at least a photosensitive member 11, a charging unit 12, an exposure unit 13, a developing roller 15 (a developing device), and a primary transfer unit 16. The image forming apparatus 10 further includes at least an intermediate transfer belt 17 (an intermediate transfer member), a secondary transfer unit 19, a driving roller 20, a feed cassette 21, a conveyance path 23, a fixing unit 24, and a motor 150. The photosensitive member 11, the charging unit 12, the developing roller 15, the primary transfer unit 16, the intermediate transfer belt 17, the secondary transfer unit 19, and the fixing unit 24 configure an image forming unit which forms an image on a recording material P (a sheet) which is fed from the feed cassette 21 to be conveyed on the conveyance path 23.

The photosensitive member 11 is rotationally driven to rotate in a clockwise direction in FIG. 1 at a time of image formation. The charging unit 12 charges the surface of the photosensitive member 11 to a uniform potential. The exposure unit 13 forms an electrostatic latent image on the photosensitive member 11 by exposing the surface of the photosensitive member 11 with light based on image data of a formation target image. The developing roller 15 develops an electrostatic latent image of the photosensitive member 11 by a toner to visualize the electrostatic latent image as the toner image. The primary transfer unit 16 transfers the toner image formed on the photosensitive member 11, onto the intermediate transfer belt 17 based on a primary transfer bias. Note that, as a result of toner images formed on each photosensitive member 11 being overlaid and transferred onto the intermediate transfer belt 17, a full-color image is formed on the intermediate transfer belt 17.

The intermediate transfer belt 17 is rotationally driven by the driving roller 20 to rotate in a counterclockwise direction in FIG. 1. By this, the toner image transferred onto the intermediate transfer belt 17 is conveyed to an opposite position of the secondary transfer unit 19. Meanwhile, the recording material P (the sheet) stored in the feed cassette 21 is fed in the conveyance path 23 and conveyed to the opposite position of the secondary transfer unit 19 along the conveyance path 23. In the conveyance path 23, a conveyance roller for conveying the recording material P is disposed. The secondary transfer unit 19 transfers the toner image on the intermediate transfer belt 17 onto the recording material P based on a secondary transfer bias. After this, the recording material P is conveyed to the fixing unit 24. The fixing unit 24 fixes the toner image on the recording material P by adding heat and pressure to the recording material P. After fixing of the toner image, the recording material P is discharged to outside of the image forming apparatus 10.

In the present embodiment, the motor 150 is configured as a DC brushless motor. A drive force of the motor 150 is delivered to the photosensitive member 11, the charging unit 12, the developing roller 15, the primary transfer unit 16, and the driving roller 20 via a gear mechanism (not illustrated). Also, a drive force of the motor 150 is delivered, via the gear mechanism, to a conveyance roller (a rotational member) for conveying the recording material P along a conveyance path. Accordingly, the motor 150 is used as a driving source of a conveyance roller (a rotational member) for conveying the recording material P (a sheet) along a conveyance path or a driving source of an image formation unit which forms an image on the sheet conveyed on a conveyance path.

Figure 2:
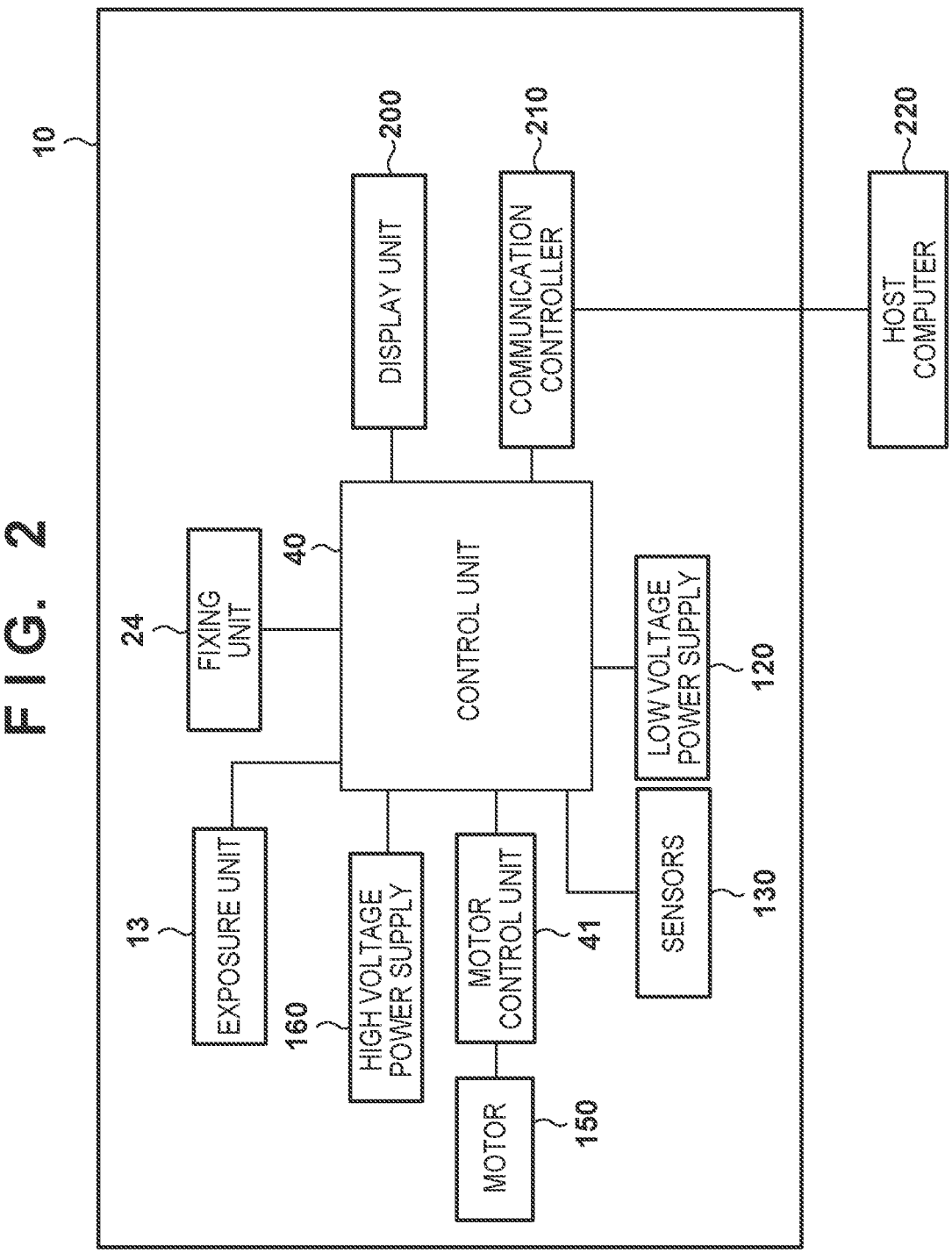
FIG. 2 is a block diagram for illustrating an example of a control configuration of the image forming apparatus.

FIG. 2 is a block diagram for illustrating an example of a control configuration of the image forming apparatus 10. As illustrated in FIG. 2, the image forming apparatus 10 further comprises a control unit 40, a low voltage power supply 120, sensors 130, a motor control unit 41, a high voltage power supply 160, a display unit 200, and a communication controller 210. The motor control unit 41 controls the motor 150 in accordance with an instruction from the control unit 40.

The control unit 40 includes a microcomputer, which uses a microprocessor as a CPU, and a memory. The microcomputer controls each device within the image forming apparatus 10 based on various control programs and various data stored in the memory. The sensors 130 are a plurality of sensors for detecting state of each device within the image forming apparatus 10 or state of the recording material P or the like.

The low voltage power supply 120 is a switching power supply that outputs direct-current voltage. The output voltage of the low voltage power supply 120 is controlled to be maintained within a predetermined voltage control range. Also, the output voltage of the low voltage power supply 120 is controlled to be a voltage within a voltage control range even in relation to a change in a load on the low voltage power supply 120. However, there are cases where the output voltage of the low voltage power supply 120 cannot follow a sudden change in the load. For example, in a case of a sudden increase in the load, an overshoot will occur in the output voltage if an undershoot occurs in the output voltage and the load suddenly decreases. The direct-current voltage that the low voltage power supply 120 outputs is supplied to each device in the image forming apparatus 10, and is used to rotationally drive the motor 150, for example.

The high voltage power supply 160 generates various bias voltages (for example, a charge bias voltage, a developing bias voltage, and a transfer bias voltage) necessary for image formation. The communication controller 210 communicates with an external apparatus such as a host computer 220. For example, the communication controller 210 receives data for printing from the host computer 220.

The control unit 40, when it receives image data of an image of a formation target from the host computer 220 via the communication controller 210, starts image formation for the recording material P based on the received image data. The control unit 40, when it starts image formation, controls the motor control unit 41 to rotationally drive the motor 150. By this, the control unit 40 performs drive control of a rotational member such as the photosensitive member 11, and conveyance control of the recording material P. The control unit 40 controls the exposure unit 13 so as to form an electrostatic latent image on the photosensitive member 11. The control unit 40 further controls the high voltage power supply 160 so as to output bias voltages for image formation to the charging unit 12, the developing roller 15, the primary transfer unit 16, and the secondary transfer unit 19. Also, the control unit 40 performs display control for displaying a screen such as a screen indicating state of the image forming apparatus 10 on the display unit 200, and control of the sensors 130 for detecting states of the recording material P or the image forming apparatus 10.

<Motor Control Unit>

Figure 3:
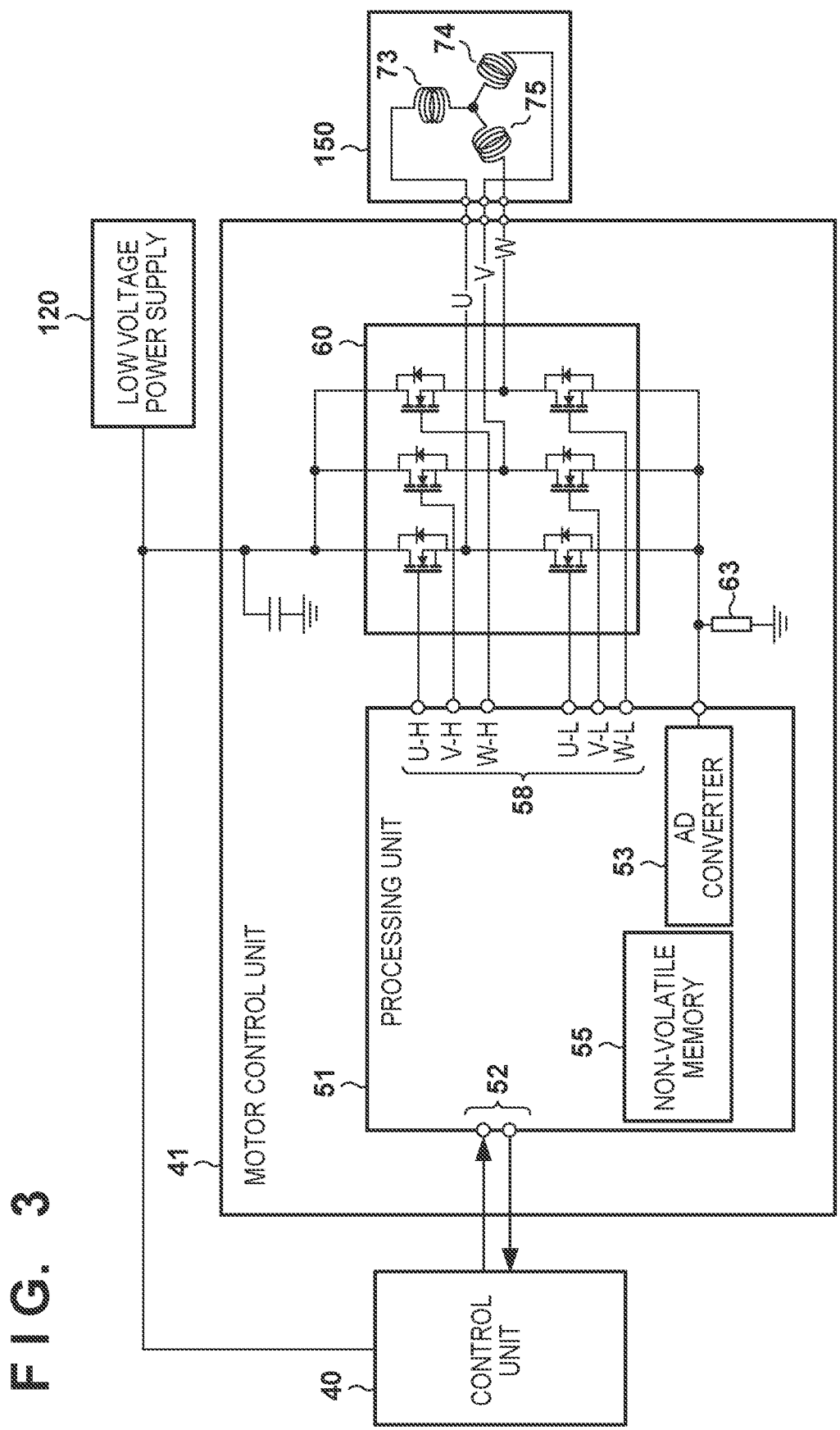
FIG. 3 is a block diagram for illustrating an example of a configuration of a motor control unit.

FIG. 3 illustrates an example of a configuration of the motor control unit 41. In the present embodiment, although the motor control unit 41 is arranged as one component of the image forming apparatus 10, it may be referred to as a motor control apparatus when it is configured as one apparatus. Also, an apparatus including the control unit 40 and the motor control unit 41 may be referred as a motor control apparatus.

The motor control unit 41 comprises a processing unit 51 and an inverter 60. The processing unit 51 can be realized by a microcomputer or the like. The processing unit 51 includes a communication port 52 and a pulse width modulation (PWM) port 58. The processing unit 51 performs serial data communication with the control unit 40 via the communication port 52. Also, the processing unit 51 outputs a PWM signal for driving each switching element of the inverter 60 via the PWM port 58.

The inverter 60 is connected to the motor 150 which is a target of control by the motor control unit 41. The motor 150 is a three-phase motor including three-phase (a U phase, a V phase, and a W phase) windings (coils) 73 to 75. The inverter 60 is a three-phase inverter configured by six switching elements that include three switching elements at a high-side respectively corresponding to the U phase, the V phase, and the W phase, and three switching elements at a low-side respectively corresponding to the U phase, the V phase, and the W phase. In other words, the inverter 60 comprises switching elements at a high-side and low-side connected to the coil 73 in the U phase, switching elements at a high-side and low-side connected to the coil 74 in the V phase, and switching elements at a high-side and low-side connected to the coil 75 in the W phase. Each switching element of the inverter 60 is, for example, configured by a transistor or a FET.

The PWM port 58 includes six terminals respectively corresponding to six switching elements of the inverter 60. In other words, the PWM port 58 includes terminals at the high-side and low-side corresponding to the U phase (a U-H terminal and a U-L terminal), terminals at the high-side and low-side corresponding to the V phase (a V-H terminal and a V-L terminal), and terminals at the high-side and low-side corresponding to the W phase (a W-H terminal and a W-L terminal).

The inverter 60 operates by receiving supply of direct-current voltage from the low voltage power supply 120. The three switching elements on the high-side of the inverter 60 are one example of a plurality of switching elements that are respectively connected to the low voltage power supply 120, and are respectively connected to different coils of the motor 150. Each switching element of the inverter 60 can be driven by a PWM signal output from a corresponding terminal of the PWM port 58. By the PWM signal output from the PWM port 58, on and off of each switching element of the inverter 60 are controlled. By this, a current for excitation flows from the inverter 60 to the coil 73 (the U phase), the coil 74 (the V phase), and the coil 75 (the W phase) of the motor 150. The processing unit 51 controls current (exciting current) which flows to each of the coils 73 to 75 by controlling on and off of each switching element of the inverter 60.

Accordingly, the inverter 60 functions as an excitation unit which excites a coil targeted for excitation among the plurality of coils 73 to 75 of the motor 150 by the plurality of switching elements being driven (excites an excitation phase targeted for excitation among a plurality of excitation phases of the motor 150).

A resistor 63 is used for detecting the exciting current supplied to each of the coils 73 to 75. Specifically, the exciting current supplied to each of the coils 73 to 75 is converted to voltage by the resistor 63. Voltage after conversion is input to an AD converter 53 of the processing unit 51. The AD converter 53 converts the input voltage to a digital value by performing analog/digital (A/D) conversion with respect to the input voltage, and outputs the digital value as a value indicating a detection result of the exciting current. A non-volatile memory 55 functions as a holding unit which holds data or the like used for processing by the processing unit 51.

<Configuration of Motor>

Figure 4B:
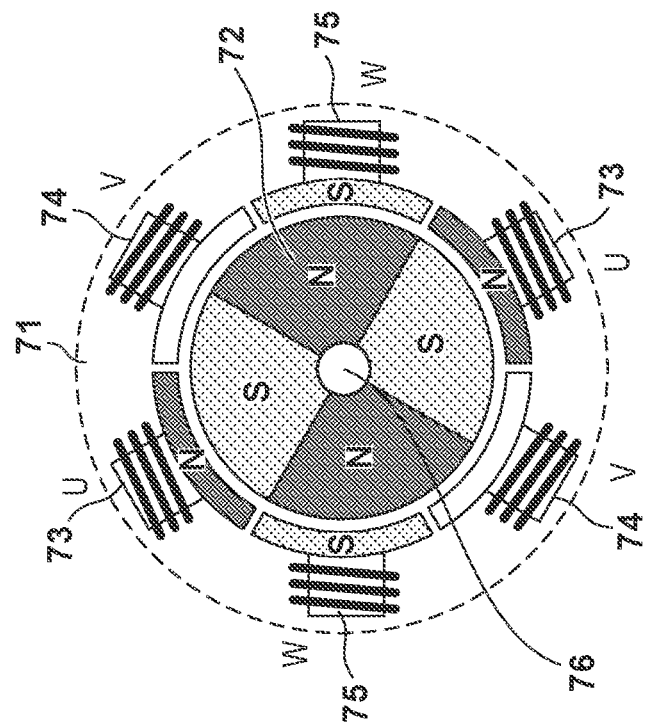
FIGS. 4A and 4B illustrate an example of a configuration of a motor.
Figure 4A:
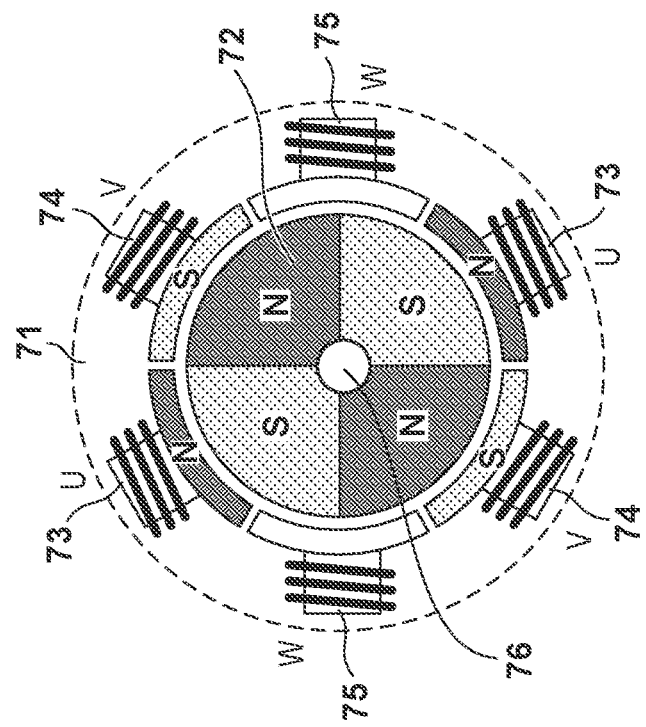

FIGS. 4A and 4B illustrate a specific example of a configuration of the motor 150. The motor 150 includes a stator 71 of six slots and rotors 72 of four poles. The stator 71 comprises the coil 73 in the U phase, the coil 74 in the V phase, and the coil 75 in the W phase as three-phase (the U phase, the V phase, and the W phase) coils, and the coils 73 to 75 are connected with a star connection. The coils 73 to 75 are respectively separated into two slots, and two slots of each coil are connected with, for example, a copper line (not illustrated) each other. The rotor 72 is configured by a permanent magnet and includes two pairs of N poles and S poles. The rotor 72 can rotate about a motor shaft 76.

In the present embodiment, there are total six excitation phases, U-V, U-W, V-U, V-W, W-U, and W-V, as combinations of excited coils among the coils 73 to 75 (in other words, excitation phases). Note that, in the present specification, for example, "excites the U-V phase" means that the inverter 60 is driven by the PWM signal output from the PWM port 58 such that the exciting current flows from a coil in the U phase to a coil in the V phase. Accordingly, the exciting current flows from the coil 73 in the U phase to the coil 74 in the V phase when exciting the U-V phase, and at this time, coils in the U phase become N poles and coils in the V phase become S poles.

Generally, the coils such as the coils 73 to 75 are configured by a copper wire wound around a core formed of laminated electromagnetic steel sheets. Also, the magnetic permeability of an electromagnetic steel sheet becomes small when an external magnetic field is present. The inductance of a coil is proportional to the magnetic permeability of a core, and therefore when the magnetic permeability of the core becomes small, the inductance of the coil also becomes small. Accordingly, the amount of decrease of inductance of coils influenced by an external magnetic field changes in accordance with the degree of influence of the external magnetic field. Specifically, the larger the degree of influence of the external magnetic field by the rotor 72, the larger the amount of decrease of the inductance of coils.

For example, in a case where the rotor 72 stops at the position illustrated in FIG. 4A, only the S poles of the rotor 72 oppose the coils 73 in the U phase, and both the S poles and the N poles (the middle portion between the S pole and the N pole) of the rotor 72 oppose the coils 75 in the W phase. In such a case, the influence of the external magnetic field by the rotor 72 is larger in the coils 73 in the U phase than in the coils 75 in the W phase. Accordingly, the amount of decrease in the inductance of the coils 73 in the U phase is larger than the amount of decrease in the inductance of the coils 75 in the W phase.

Also, the amount of change of the inductance of the coils 73 to 75 differs depending on whether the direction of the magnetic field occurring due to the exciting current flowing through the coils and the direction of the external magnetic field by the rotor 72 are the same or opposing. For example, in the state of FIG. 4A, in a case where the exciting current flowed in the direction in which the U phase becomes the N pole, the amount of decrease in the inductance of the coils 73 becomes larger than in the case where the exciting current flowed such that the U phase becomes the S pole. Note that, when the direction of the magnetic field which occurred due to the exciting current flowing through a certain coil and the direction of the external magnetic field due to the rotor 72 become the same direction, such as with the coils 73 in FIG. 4A, the amount of decrease of the inductance of the coil becomes greatest. Accordingly, in a case where the motor 150 stops, the inductance of each of the coils 73 to 75 changes in accordance with the stop position (rotational phase) and the excitation phase of the rotor 72.

Also, at a time of stopping the motor 150, the position at which the rotor 72 stops (rotational phase) is determined in accordance with the combination of the excited coils (in other words, the excitation phase) among the coils 73 to 75. For example, when exciting the U-V phase, the exciting current flows from the coil 73 in the U phase to the coil 74 in the V phase, and the coil 73 in the U phase becomes the N pole and the coil 74 in the V phase becomes the S pole. By this, the rotor 72 stops at the position illustrated in FIG. 4A. Next, when exciting the U-W phase, the exciting current flows from the coil 73 in the U phase to the coil 75 in the W phase, and the coil 73 in the U phase becomes the N pole and the coil 75 in the W phase becomes the S pole. By this, the rotor 72 stops at the position illustrated in FIG. 4B.

As described above, in a case where the rotor 72 is stopped, the inductance (combined inductance) of an excitation phase that is detected when the excitation phase is excited differs depending on the stop position of the rotor 72. The difference of the inductance of the excitation phase also causes the speed of startup of the exciting current when the exciting current flows through the coil constituting the excitation phase to be different.

Figure 5A:
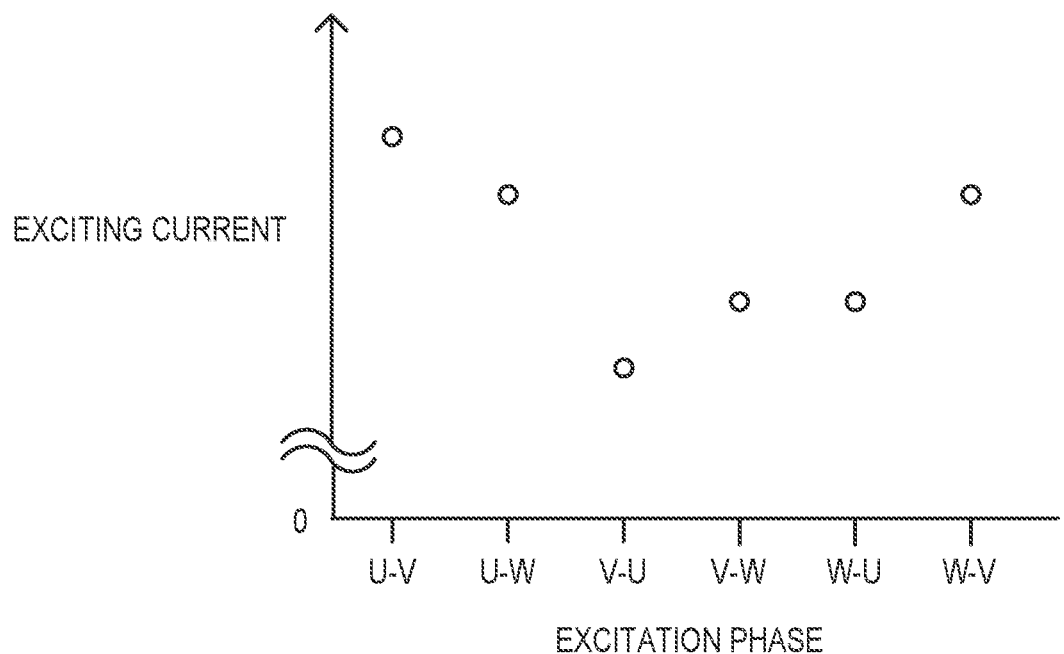
FIGS. 5A and 5B illustrate examples of detecting a maximum value and inductance of an exciting current for each excitation phase.
Figure 5B:
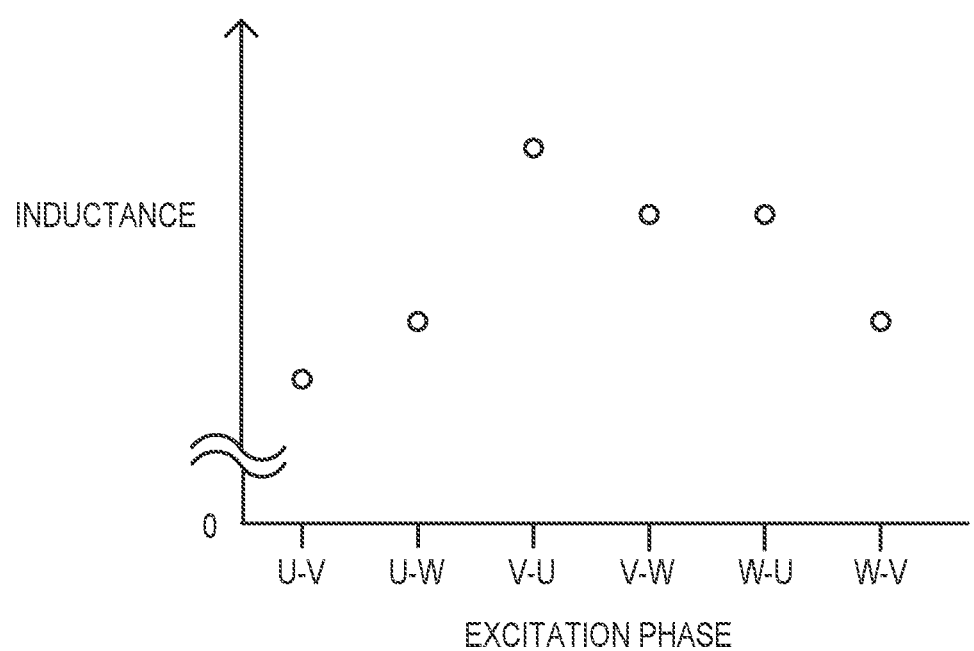

FIG. 5A and FIG. 5B illustrate example of detection of a maximum value of an exciting current corresponding to each excitation phase and an inductance of each excitation phase, obtained in the case where each excitation phase is excited in order when the rotor 72 is stopped at a position indicated in FIG. 4A. Note that the position indicated in FIG. 4A corresponds to the position at which the rotor 72 stops in the case of exciting the U-V phase. FIG. 5A illustrates an example of a result of detecting the maximum value of the exciting current, obtained by exciting each excitation phase in order for a predetermined period and measuring an exciting current when each excitation phase is excited. FIG. 5B illustrates an example of a result of detecting the inductance (combined inductance) of each excitation phase corresponding to the result of measuring the exciting current illustrated in FIG. 5A.

In a case where the U-V phase and the V-U phase, for example, are excited in a state in which the rotor 72 is stopped at the position illustrated in FIG. 4A, the inductance of each excitation phase and the maximum value of the corresponding exciting current are detected as follows. in the case of exciting the V-U phase, the exciting current flows from the coil 74 in the V phase to the coil 73 in the U phase, and hence the coil 74 in the V phase becomes the N pole and the coil 73 in the U phase becomes the S pole. At this time, as illustrated in FIG. 4A, the N pole of the rotor 72 faces the coil 74 of the V phase, and the S pole of the rotor 72 faces the coil 73 of the U phase. In such a case, as illustrated in FIG. 5A and FIG. 5B, the inductance becomes large for both the coil 74 of the V phase and the coil 73 of the U phase, and the inductance of the V-U phase is to be the maximum, and the maximum value of the exciting current of the V-U phase is to be the minimum.

Meanwhile, in the case of exciting the U-V phase, the exciting current flows from the coil 73 of the U phase to the coil 74 of the V phase, and hence the coil 73 of the U phase becomes the N pole and the coil 74 of the V phase becomes the S pole. At this time, as illustrated in FIG. 4A, the S pole of the rotor 72 faces the coil 73 of the U phase, and the N pole of the rotor 72 faces the coil 74 of the V phase. In such a case, as illustrated in FIG. 5A and FIG. 5B, the inductance becomes small for both the coil 73 of the U phase and the coil 74 of the V phase, and the inductance of the U-V phase is to be the minimum, and the maximum value of the exciting current is to be the maximum.

Accordingly, in the present embodiment, the stop position of the rotor 72 is determined (estimated) based on the relative magnitude relationship of the maximum value (or impedance) of the exciting current, obtained by exciting each excitation phase in order and measuring the exciting current flowing through the coils that configure each excitation phase. For example, in the case where the maximum value of the exciting current detected when the U-V phase is excited is larger than the maximum value of the exciting current detected when any of the other excitation phases are excited, it is possible to determine that the rotor 72 has stopped at a position (the position illustrated in FIG. 4A) corresponding to the U-V phase.

<Relationship Between Driving of the Inverter and the Exciting Current>

Next, with reference to FIGS. 6A to 6D, the driving of the inverter 60, and how the exciting current flows through the motor 150 in accordance with driving will be described. In the present embodiment, in order to determine the stop position of the rotor 72, by exciting each excitation phase for a predetermined period of time, in order, an exciting current is made to flow through the coils constituting the excitation phase targeted for excitation, and measurement of the exciting current is performed. Here, the excitation phase targeted for excitation is excited across a first time period and a second time period that continues after the first time period. Hereinafter, description will be given of an example of a case in which the U-V phase is excited.

Firstly, in the first time period, the processing unit 51, from the U-H terminal of the PWM port 58 to the inverter 60, outputs a PWM signal that has a set duty ratio and alternatingly repeats the high (H) level and the low (L) level. Also, a voltage whose polarity is reversed from the voltage outputted from the U-H terminal is outputted from the U-L terminal. Specifically, in the case where the U-H terminal is the H-level, the U-L terminal is set to the L-level, and in the case where the U-H terminal is the L-level, the U-L terminal is set to the H-level. Note that the V-L terminal is set to be fixed at the H-level, and the other terminals are set to be fixed at the L-level.

Figure 6A:
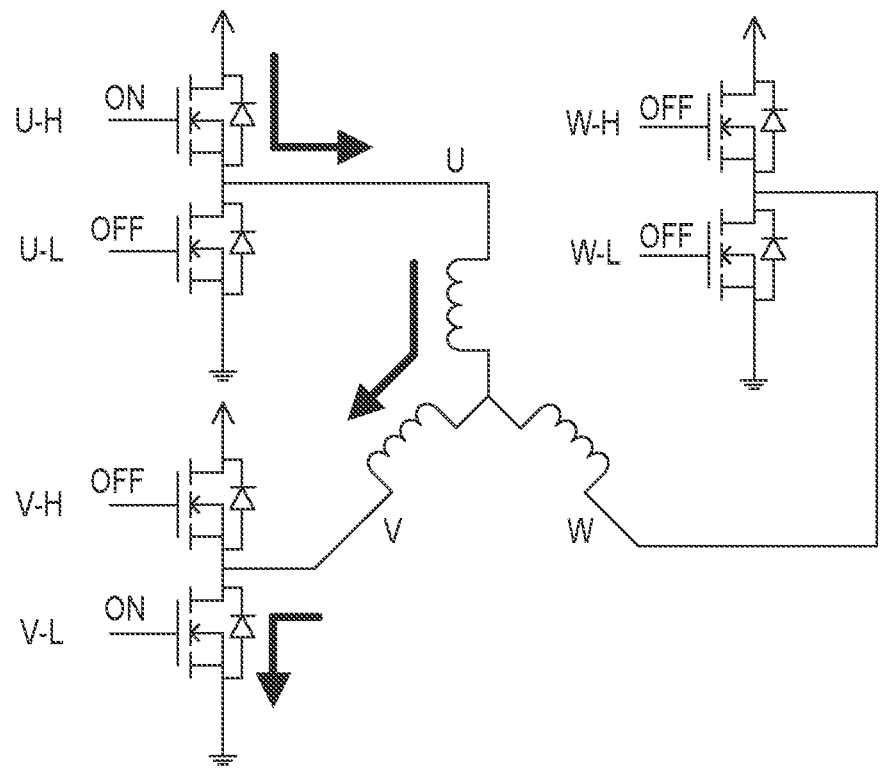
FIGS. 6A to 6D illustrate examples of a relation between inverter driving and the exciting current that flows through the motor.
Figure 6B:
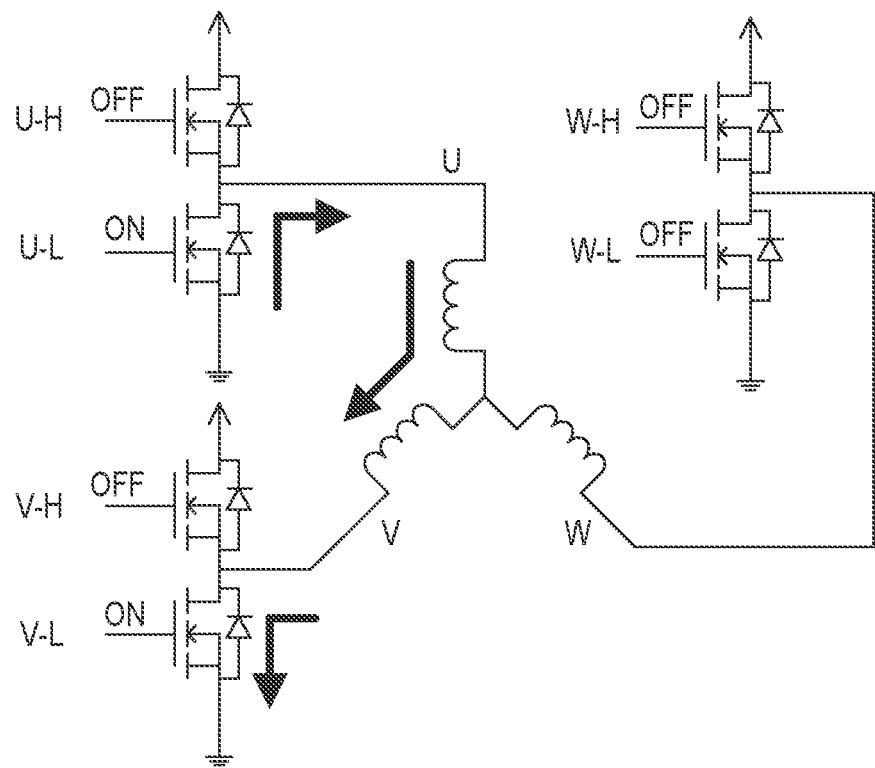

In the first time period, the processing unit 51 drives the inverter 60 by a PWM signal outputted from the U-H terminal and the U-L terminal of the PWM port 58. FIG. 6A illustrates a case where the output voltage of the U-H terminal is the H-level, and the output voltage of the U-L terminal is the L-level. FIG. 6B illustrates a case where the output voltage of the U-H terminal is the L-level and the output voltage of the U-L terminal is the H-level. The driving state of the inverter 60 switches alternately between the state illustrated in FIG. 6A and the state illustrated in FIG. 6B. By such driving of the inverter 60, as illustrated by the arrow symbols in FIGS. 6A and 6B, an exciting current that flows through the U-V phase (specifically that flows through the coil 73 and the coil 74 that constitute the U-V phase) is generated.

Note that, when the polarities of the voltages outputted respectively from the U-H terminal and the U-L terminal are switched between the H-level and the L-level, a time period where the voltages outputted from the two terminals are both the L-level is arranged. This is to prevent a through current from flowing through the switching elements of the inverter 60.

Next, even in the second time period that continues after the first time period, the processing unit 51 drives the inverter 60 so that the exciting current continues to flow through the U-V phase. Specifically, the processing unit 51 outputs a PWM signal having a set duty ratio from the V-H terminal of the PWM port 58 to the inverter 60. Also, from the V-L terminal, a voltage whose polarity is the reverse of the voltage outputted from the V-H terminal is outputted. Specifically, in the case where the V-H terminal is the H-level, the V-L terminal is set to the L-level, and in the case where the V-H terminal is the L-level, the V-L terminal is set to the H-level. Note that the U-L terminal is set to be fixed at the H-level, and the other terminal is set to be fixed at the L-level.

Figure 6C:
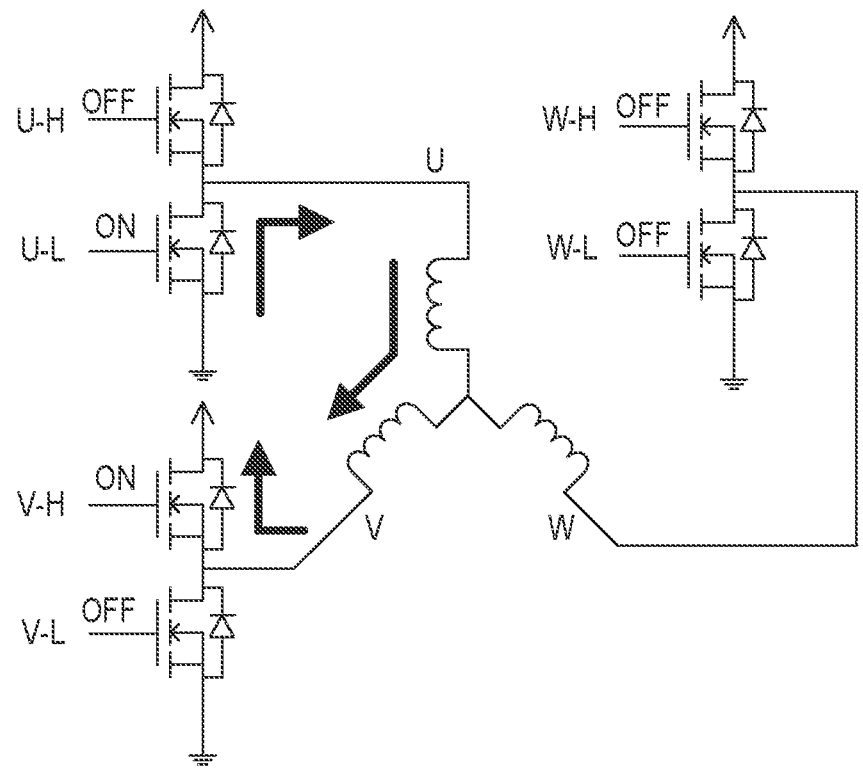
Figure 6D:
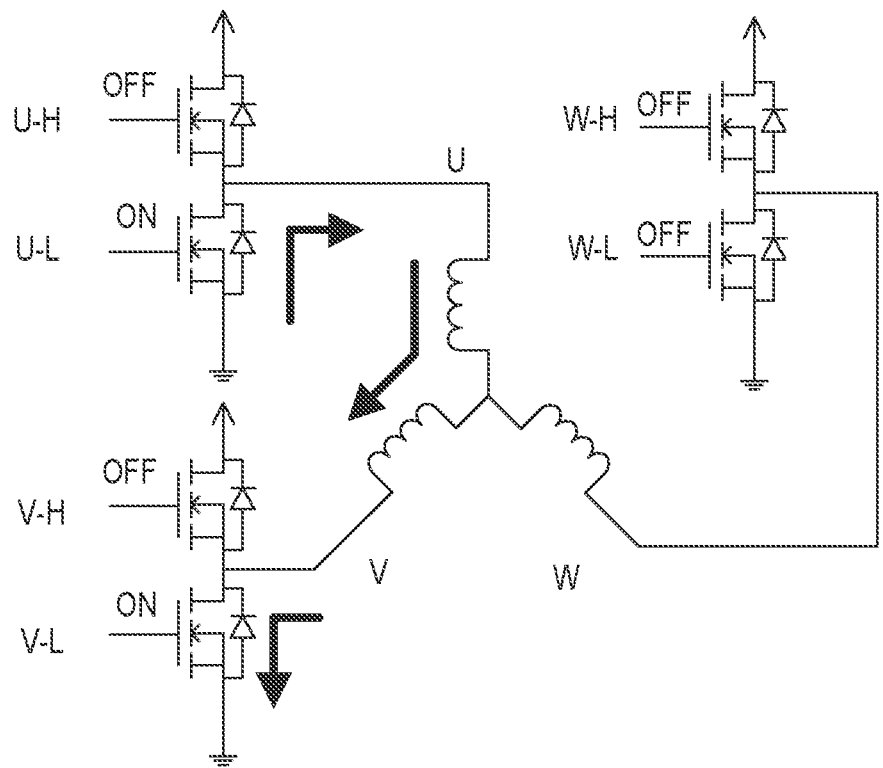

In the second time period, the processing unit 51 drives the inverter 60 by a PWM signal outputted from the V-H terminal and the V-L terminal of the PWM port 58. The driving state of the inverter 60 is switched alternatingly between the state illustrated in FIG. 6C and the state illustrated in FIG. 6D. By such driving of the inverter 60, as illustrated by the arrow symbols in FIG. 6C and FIG. 6D, an exciting current that flows through the U-V phase is generated. FIG. 6C illustrates a case where the output voltage of the V-H terminal is the H-level and the output voltage of the V-L terminal is the L-level. In such a case, as illustrated by the arrow symbols in FIG. 6C, a current is regenerated into the low voltage power supply 120 via the switching element connected to the V-H terminal. FIG. 6D illustrates a case where the output voltage of the V-H terminal is the H-level, and the output voltage of the V-L terminal is the L-level. In such a case, as illustrated by the arrow symbols in FIG. 6D, an exciting current is regenerated into ground via the switching element connected to the V-L terminal.

Note that in the second time period, similarly to the first time period, when switching the polarities of the voltages outputted respectively from the V-H terminal and the V-L terminal between the H-level and the L-level, a time period is arranged where the voltages outputted from the two terminals are both the L-level. This is to prevent a through current from flowing through the switching elements of the inverter 60.

In the state of FIG. 6C, power is accumulated in the low voltage power supply 120 by the exciting current regenerated into the low voltage power supply 120. In the case where the exciting current regenerated into the low voltage power supply 120 is relatively large, the low voltage power supply 120 cannot maintain a fixed output voltage, and an overshoot of the output voltage is caused. Accordingly, in the present embodiment, to restrict the power accumulated in the low voltage power supply 120 by the exciting current, a duty ratio of a PWM signal outputted from the V-H terminal and the V-L terminal of the PWM port 58 to the inverter 60 is adjusted. Specifically, the duty ratio of the PWM signal is adjusted so that the power accumulated in the low voltage power supply 120 falls below the supplied power that the low voltage power supply 120 supplies to a device such as the control unit 40, the high voltage power supply 160, the exposure unit 13, the display unit 200, and the communication controller 210.

By such an adjustment of the duty ratio of the PWM signal, the power according to the exciting current regenerated into the low voltage power supply 120 is consumed by the control unit 40 and the like. Accordingly, it is possible to prevent power accumulating excessively in the low voltage power supply 120. The result of this is that it is possible to prevent the output voltage of the low voltage power supply 120 changing to a voltage outside of a predetermined voltage control range (deviating from the predetermined voltage control range).

Also, the above-described adjustment of the PWM signal duty ratio is performed from the following perspective. In the case where the power according to the exciting current regenerated into the low voltage power supply 120 ends up being equal to or higher than the supplied power of the low voltage power supply 120, the low voltage power supply 120 temporarily stops the supply of power. In such a case, if a supply of power from the low voltage power supply 120 becomes necessary due to a change in the control sequence in the control unit 40, for example, there is the possibility that regulation of the output voltage will cease to be on time. There is the possibility that as a result of this, the output voltage of the low voltage power supply 120 will drop and fall below a predetermined voltage control range. Accordingly, in the present embodiment, the duty ratio of the PWM signal outputted from the V-H terminal and the V-L terminal of the PWM port 58 to the inverter 60 is adjusted so that the power according to the exciting current regenerated into the low voltage power supply 120 becomes lower than the supplied power of the low voltage power supply 120.

<Low Voltage Power Supply Operation Example>

Figure 7:
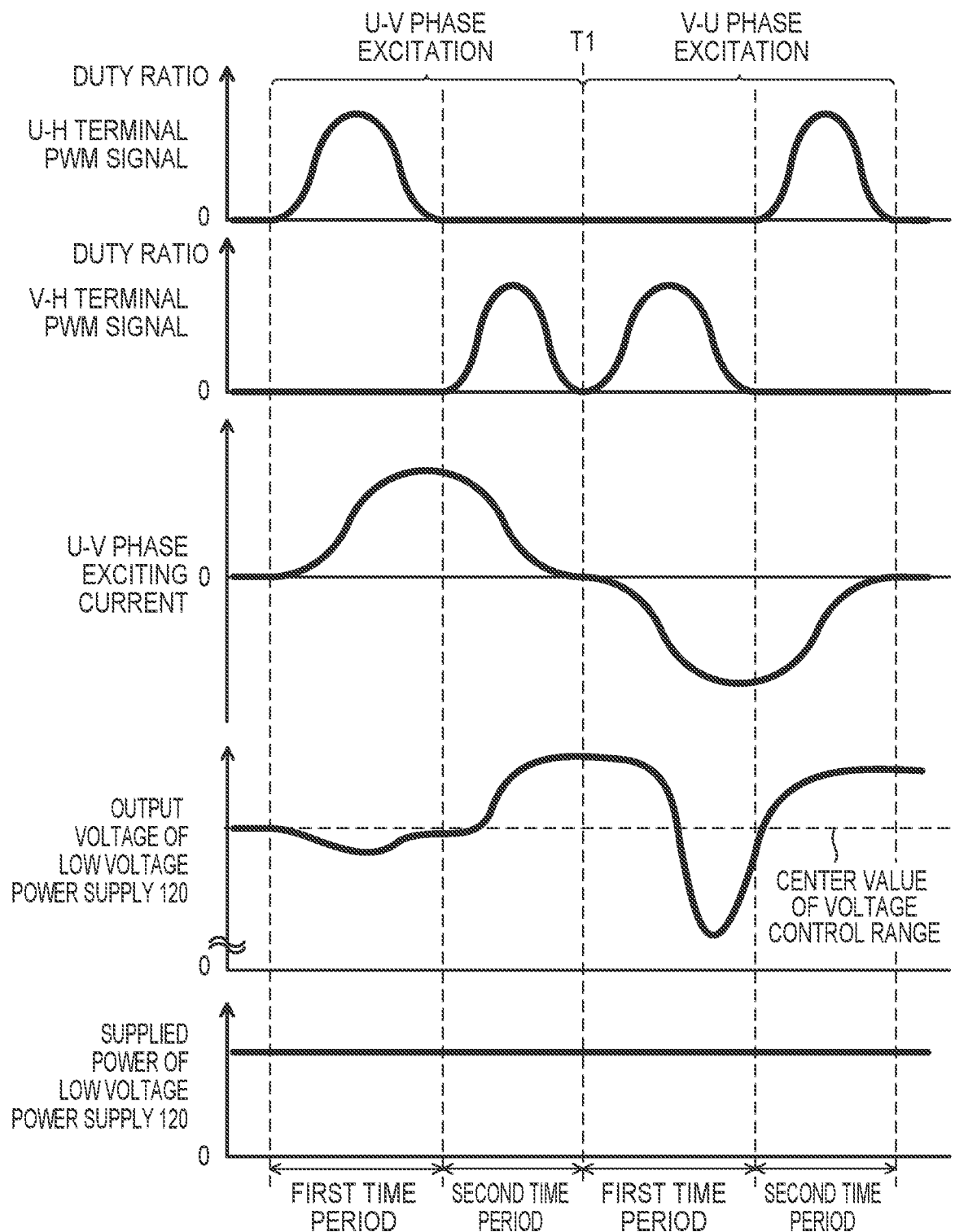
FIG. 7 illustrates an example of changes over time of a PWM signal, an exciting current, and a low voltage power supply voltage.

Next, with reference to FIG. 7, an example of operation of the low voltage power supply 120 in a case where the output voltage of the low voltage power supply 120 deviates from the predetermined voltage control range due to regeneration of the exciting current into the low voltage power supply 120 will be described. FIG. 7 illustrates a temporal change in PWM signals outputted from the U-H terminal and the V-H terminal of the PWM port 58, an exciting current of the U-V phase, and the output voltage and the supplied power of the low voltage power supply 120, in a case of exciting the U-V phase and the V-U phase in order so as to determine the stop position of the rotor 72. Note that in this figure, temporal changes in the duty ratio for each PWM signal are illustrated. Also, the exciting current of the U-V phase exhibits a positive value in the case where the exciting current flows from the coil 73 of the U phase to the coil 74 of the V phase, and, in the opposite direction, exhibits a negative value in the case where the exciting current flows from the coil 74 of the V phase to the coil 73 of the U phase.

As illustrated in FIG. 7, in the initial first time period and second time period, to excite the U-V phase, a PWM signal whose duty ratio changes in a pattern for measurement is outputted in order of the U-H terminal then the V-H terminal of the PWM port 58. In the subsequent first time period and second time period, so as to excite the V-U phase, a PWM signal whose duty ratio changes in a pattern for measurement is outputted in order of the V-H terminal then the U-H terminal of the PWM port 58. Note that, in the example of FIG. 7, in excitation of both the U-V phase and the V-U phase, a PWM signal whose duty ratio changes in a sinusoidal pattern is employed.

In the example of FIG. 7, the output voltage of the low voltage power supply 120 in the time period in which excitation of the V-U phase is performed differs from the output voltage in the time period in which excitation of the U-V phase is performed. Accordingly, when the voltage outputted from the low voltage power supply 120 at the time of excitation of each excitation phase differs, the accuracy of the determination of the stop position of the rotor 72 drops. Accordingly, in order to determine the stop position of the rotor 72 with good accuracy, it is necessary to cause the exciting current to flow through (the coils constituting) the excitation phase to be targeted for excitation, in a state in which the output voltage of the low voltage power supply 120 is fixed (at least falls inside a predetermined voltage control range).

Also, there are cases where the low voltage power supply 120 stops the supply of power when, due to regeneration of the exciting current, the output voltage reaches a state in which it deviates from the predetermined voltage control range. In a case where, in this state, the inverter 60 is driven to cause an exciting current to flow through the motor 150, regulation of the output voltage of the low voltage power supply 120 is not on time, and a sudden drop in the output voltage of the low voltage power supply 120 occurs. In the example of FIG. 7, in the second first time period from T1 (the first time period for exciting the V-U phase), the output voltage of the low voltage power supply 120 drops to fall below the predetermined voltage control range. Such a sudden drop in the output voltage of the low voltage power supply 120 introduces a reduction in the accuracy in determining the stop position of the rotor 72.

Accordingly, in a case where the output voltage of the low voltage power supply 120 deviates from the voltage control range, so as to avoid the accuracy in determining the stop position of the rotor 72 dropping, it is necessary to wait for the output voltage of the low voltage power supply 120 to return to within the voltage control range and then excite the excitation phase of the next citation target. However, when such a waiting time occurs, the time needed for determining the stop position of the rotor 72 increases. Accordingly, the present embodiment enables reduction of the time until the excitation phase of the next excitation target is excited so as to determine the stop position of the rotor 72, by reducing the change in the output voltage of the low voltage power supply 120.

<Adjustment of the Duty Ratio of the PWM Signal>

Figure 8:
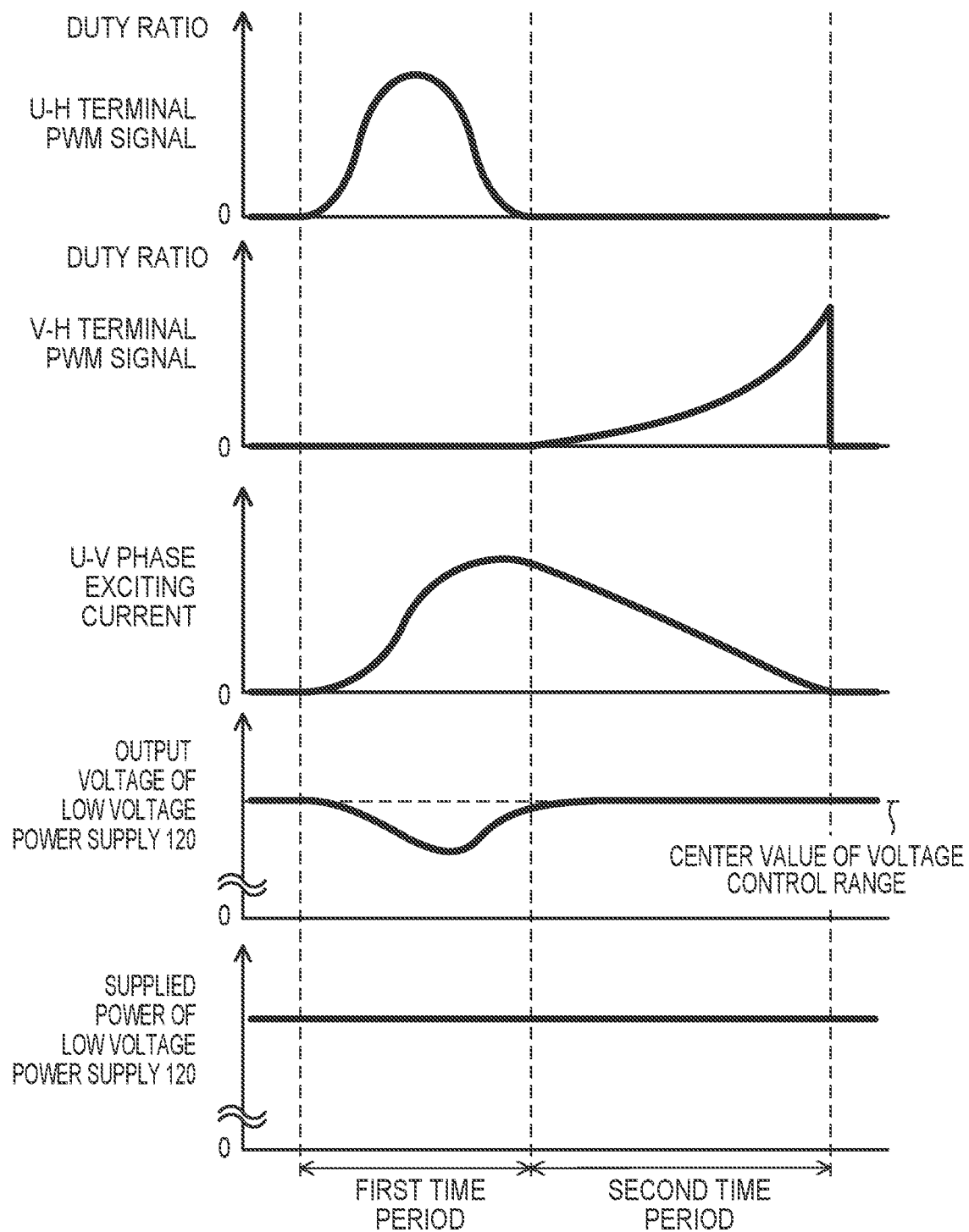
FIG. 8 illustrates an example of changes over time of the PWM signal, the exciting current, and the low voltage power supply voltage.

Next, with reference to FIG. 8, control of PWM signals outputted from the U-H terminal and the V-H terminal of the PWM port 58 in the present embodiment will be described. FIG. 8 illustrates a temporal change in PWM signals outputted from the U-H terminal and the V-H terminal of the PWM port 58, an exciting current of the U-V phase, and the output voltage and the supplied power of the low voltage power supply 120, in a case of exciting the U-V phase so as to determine the stop position of the rotor 72. In the example of FIG. 8, the PWM signal outputted from the U-H terminal is one example of a first PWM signal outputted to a first switching element connected to a coil corresponding to a first phase of an excitation phase targeted for excitation. Also, the PWM signal outputted from the V-H terminal is an example of a second PWM signal outputted to a second switching element connected to a coil corresponding to a second phase of the excitation phase targeted for excitation.

In the first time period in which the U-V phase is excited, the processing unit 51 outputs a PWM signal, whose duty ratio is changed temporally as illustrated in FIG. 8, from the U-H terminal of the PWM port 58 to the inverter 60. Specifically, in the first time period, as illustrated in FIG. 8, a PWM signal whose duty ratio changes in a sinusoidal pattern is outputted from the U-H terminal. Note that, as illustrated in FIGS. 6A and 6B, in the first time period, the output voltage of the V-L terminal of the PWM port 58 is set to be fixed at an H-level (duty ratio of 100%). Also, the output voltage of other terminals is set to be fixed at an L-level (duty ratio of 0%).

In accompaniment of an increase in the supplied power of the low voltage power supply 120 by the generation of the exciting current in the U-V phase by such driving of the inverter 60, the output voltage of the low voltage power supply 120 drops temporarily. The temporary drop in voltage is something that occurs each time the respective excitation phases are excited in order (within the voltage control range), and does not affect the accuracy in determining the stop position of the rotor 72.

Thereafter, in the second time period which follows the first time period, the processing unit 51, as illustrated in FIG. 8, outputs a PWM signal whose duty ratio changes in a pattern that increases with time (monotonically increases), from the V-H terminal of the PWM port 58. Note that as illustrated in FIG. 6C and FIG. 6D, in the second time period, the output voltage of the U-L terminal of the PWM port 58 is set to be fixed at the H-level (the duty ratio of 100%). Also, the output voltage of other terminals is set to be fixed at an L-level (duty ratio of 0%).

In the second time period, the exciting currents that respectively flow in the coil 73 to the coil 75, due to power consumption by a resistor of each coil and the supply of power (regeneration) to the low voltage power supply 120, decrease with time. Accordingly, in the present embodiment, the duty ratio of the PWM signal that is outputted from the V-H terminal of the PWM port 58 in the second time period changes in a pattern that increases with time. By this, it becomes possible to keep the power supplied to the low voltage power supply 120 fixed, and it becomes possible to cause the exciting current to converge to 0 in a short time. The result of this is that it is possible to prevent a change in the output voltage of the low voltage power supply 120 from occurring as illustrated in FIG. 7, and it is possible to reduce the time until the excitation of the excitation phase of the next excitation target is started to determine the stop position of the rotor 72.

Also, as described above, the pattern data for changing, so that the output voltage of the low voltage power supply 120 does not deviate from the voltage control range, the duty ratio of the PWM signal that is outputted from each terminal of the PWM port 58 is created in advance and stored in the non-volatile memory 55. This pattern data represents a pattern that causes the duty ratio of the PWM signal to change temporally. Regarding the pattern of the PWM signal, for example, a variation amount in the supplied power of the low voltage power supply 120 is measured by experimentation conducted in advance, and based on the measurement results, a pattern that causes the duty ratio of the PWM signal to increase/decrease in accordance with the increase/decrease of the supplied power is designed. Specifically, the pattern of the duty ratio is created in advance based on the measurement results of the change in supplied power of the low voltage power supply 120 accompanying a change in the load connected to the low voltage power supply 120.

Also, in correspondence with each of the plurality of control sequences of the control unit 40, a plurality of different patterns may be created. In such a case, the processing unit 51, to optimize the attenuation rate of the exciting current, decides (changes) the pattern to be used in accordance with the operation state of the image forming apparatus 10 among the plurality of patterns that pattern data stored in the non-volatile memory 55 represent. For example, the processing unit 51, based on supplied power of the low voltage power supply 120, decides the pattern to be used among the plurality of patterns stored in the non-volatile memory 55.

For example, in a case where the motor control unit 41 controls a plurality of motors and determines the stop position of the rotor 72, if a motor other than the determination target motor is rotating, the supplied power of the low voltage power supply 120 becomes larger. At that time, the processing unit 51 outputs a PWM signal to the inverter 60 using pattern whose duty ratio is relatively larger than the other patterns in the second time period, to thereby attenuate the exciting current in a short time. Accordingly, a change in the output voltage of the low voltage power supply 120 can be reduced, and it becomes possible to reduce the time until excitation of the excitation phase of the next excitation target is started and to reduce the time needed to determine the stop position of the rotor 72.

Note that in the present embodiment, as illustrated in FIG. 8, an example in which the above-described first time period and second time period are consecutive was given, but a time period in which PWM signals are not outputted from the respective terminals of the PWM port 58 may be arranged between the first time period and the second time period.

As described above, in the present embodiment, the processing unit 51, when exciting a plurality of excitation phases, drives the first switching element connected to the coil corresponding to the first phase of the excitation phase targeted for excitation, according to the first PWM signal in the first time period. The processing unit 51 further drives the second switching element connected to the coil corresponding to the second phase of that excitation phase according to the second PWM signal in the second time period that is after the first time period. For example, the processing unit 51, when exciting the U-V phase among the six excitation phases, drives the switching element connected to the coil 73 of a first phase (the U phase) of the U-V phase, according to the first signal in the first time period. Also, the processing unit 51 drives the switching element connected to the coil 74 of the second phase (the V phase) of the U-V phase, according to the second PWM signal in the second time period that is after the first time period. The processing unit 51 measures the exciting current that flows in the coil of the excitation phase that is excited by the inverter 60 by using the resistor 63 and the AD converter 53. The processing unit 51 determines the stop position of the rotor of the motor 150 based on the result of measuring of the exciting current obtained by exciting the plurality of excitation phases.

When exciting the plurality of excitation phases as described above, the processing unit 51, based on the supplied power that the low voltage power supply 120 supplies, controls the duty ratio of the second PWM signal that is outputted to the second switching element in the second time period. More specifically, the processing unit 51 controls the duty ratio of the second PWM signal so that the power according to the exciting current regenerated into the low voltage power supply 120 via the second switching element in the second time period falls below the supplied power of the low voltage power supply 120.

By this, it becomes possible to prevent supply of power from the low voltage power supply 120 from stopping due to excessive accumulation of power in the low voltage power supply 120 by the power according to the exciting current regenerated into the low voltage power supply 120. Accordingly, the change in the output voltage of the low voltage power supply 120 can be reduced, and it becomes possible to reduce the time until excitation of the excitation phase of the next excitation target is started in measurement of the exciting current for determining the stop position of the rotor 72, and to reduce the time needed to determine the stop position of the rotor 72.

Second Embodiment

In the first embodiment, an example in which pattern data representing a pattern of the duty ratio of the PWM signal outputted from the processing unit 51 is created in advance and stored in the non-volatile memory 55 was described. In the second embodiment, the control unit 40 monitors the supplied power of the low voltage power supply 120, and in accordance with a change in the supplied power, changes the pattern of the duty ratio of the PWM signal outputted from the PWM port 58 of the processing unit 51. Hereinafter, description regarding portions in common with the first embodiment is omitted.

In the present embodiment, the control unit 40 monitors the power that the low voltage power supply 120 supplies. The control unit 40, in the case where the supplied power of the low voltage power supply 120 increases, changes pattern data to be used by the processing unit 51 so that the duty ratio of the PWM signal to be used in the above-described second time period becomes larger.

Figure 9:
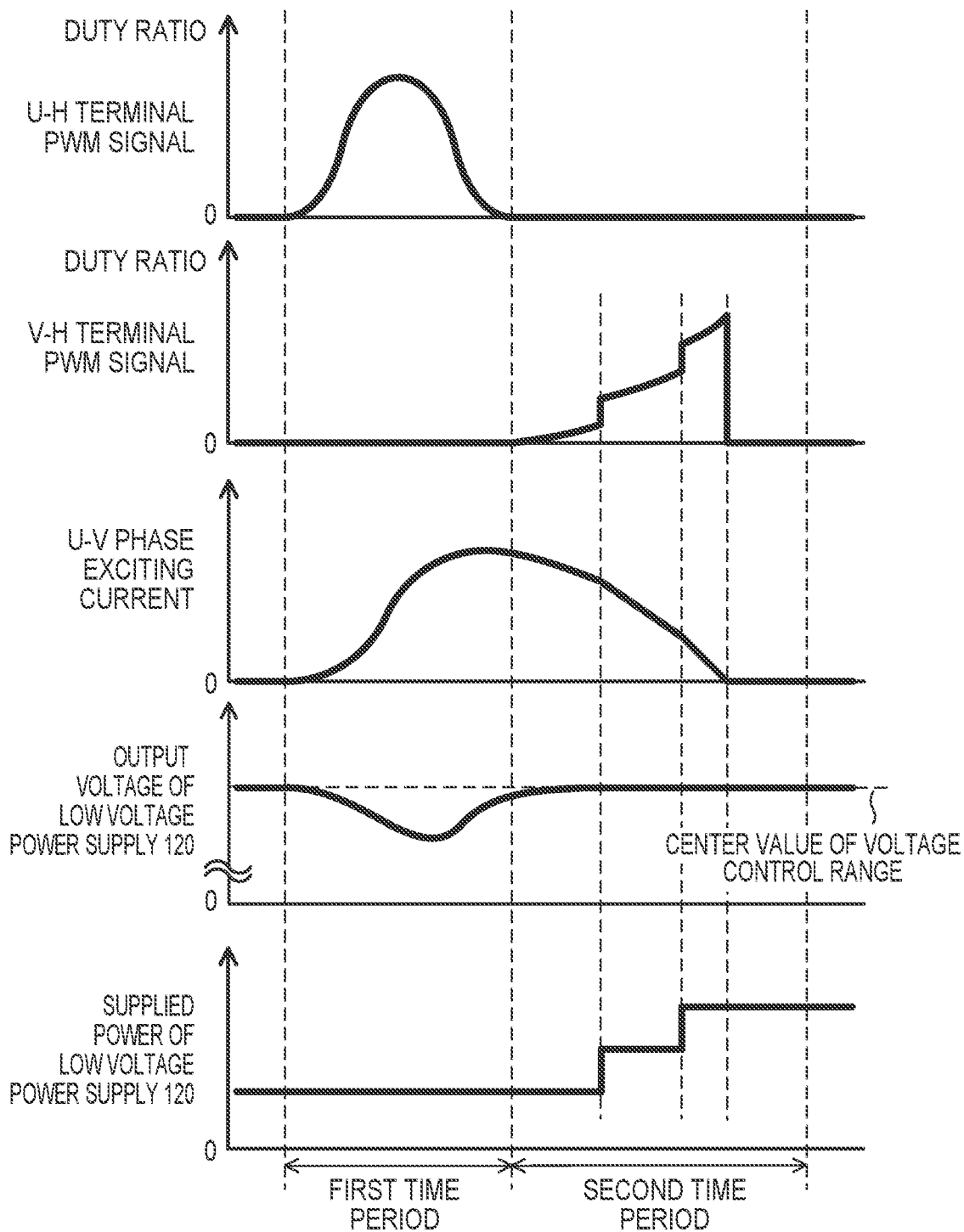
FIG. 9 illustrates an example of changes over time of a PWM signal, an exciting current, and a low voltage power supply voltage.

For example, in a case of exciting the U-V phase, as illustrated in FIG. 9, when the supplied power of the low voltage power supply 120 increases in the second time period, the duty ratio of the PWM signal outputted from the V-H terminal of the PWM port 58 is caused to increase in accordance with the increase in the supplied power. By this, the exciting current that flows through the coil 73 and the coil 74 constituting the U-V phase attenuates in a short time due to regeneration into the low voltage power supply 120. At that time, the duty ratio of the PWM signal outputted from the V-H terminal of the PWM port 58 is adjusted so that the power according to the exciting current regenerated into the low voltage power supply 120 is lower than the supplied power that the low voltage power supply 120 supplies.

Accordingly, a change in the output voltage of the low voltage power supply 120 is reduced, and it becomes possible to further reduce the time until excitation of the excitation phase targeted for next excitation starts and it is possible to further reduce the time needed to determine the stop position of the rotor 72.

Note that the control unit 40 may monitor the voltage that the low voltage power supply 120 is outputting rather than the power that the low voltage power supply 120 is supplying. When the supplied power of the low voltage power supply 120 increases, the output voltage of the low voltage power supply 120 drops temporarily. Accordingly, the control unit 40 detects such a drop in the output voltage, and causes the duty ratio of the PWM signal outputted from the V-H terminal of the PWM port 58 to increase accordingly.

By this, as described above, the exciting current that flows through the coil 73 and the coil 74 constituting the U-V phase attenuates in a short time due to regeneration into the low voltage power supply 120. At that time, the control unit 40 adjusts the duty ratio of the PWM signal outputted from the V-H terminal of the PWM port 58 so that the output voltage of the low voltage power supply 120 does not exceed the reference voltage. By this, similarly to the above-described example, a change in the output voltage of the low voltage power supply 120 is reduced, and a further reduction in the time until excitation of the excitation phase targeted for next excitation starts becomes possible, and a further reduction in the time needed in determining the stop position of the rotor 72 becomes possible.

Other Embodiments

Figure 10:
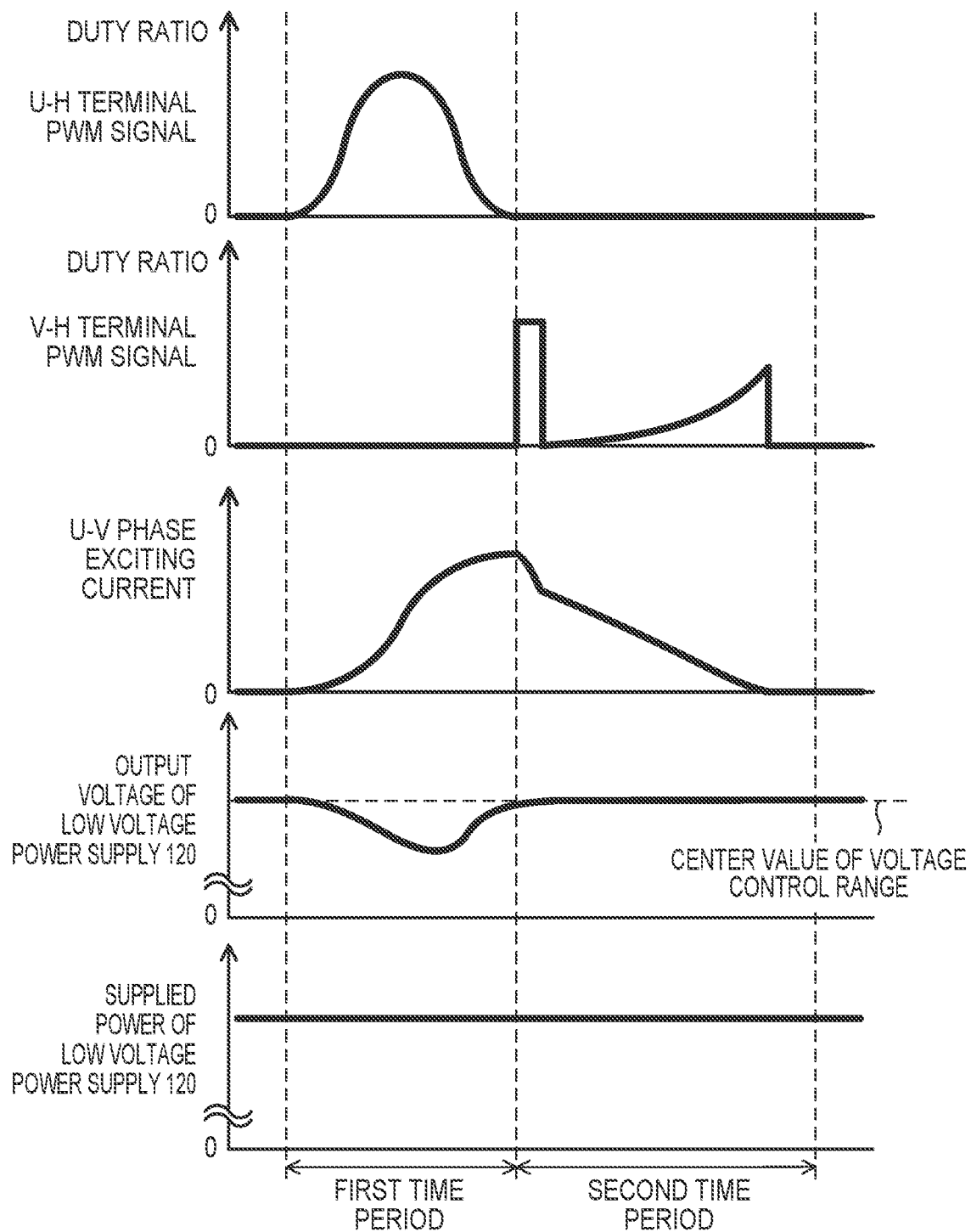
FIG. 10 illustrates an example of changes over time of a PWM signal, an exciting current, and a low voltage power supply voltage.

Various changes can be made to the above-described first and second embodiments. For example, FIG. 10 illustrates another example of a pattern of the duty ratio of the PWM signal outputted from the V-H terminal of the PWM port 58 in the second time period described using FIG. 8. FIG. 10 illustrates an example in which only initially in the second time period does the duty ratio of the PWM signal outputted from the V-H terminal of the PWM port 58 becomes large, and thereafter the duty ratio gradually becomes larger from a small value. Specifically, the processing unit 51 may output to the second switching element a PWM signal whose duty ratio changes in a pattern that, in the second time period, takes a second value that is larger than a first value initially in the second time period and that gradually increases with time from the first value thereafter. In the example illustrated in FIG. 10, as one example, the first value is set to 0% and the second value is set to 100%.

By changing the duty ratio of the PWM signal outputted from the V-H terminal of the PWM port 58 in the second time period as described above, the power regenerated into the low voltage power supply 120 increases (compared to the example illustrated in FIG. 8). By this, as illustrated in FIG. 10, it becomes possible to cause the exciting current of the U-V phase to even more quickly converge, and a further reduction in the time needed in determining the stop position of the rotor 72 becomes possible.

Also, in each of the above-described embodiments, the length of the second time period may be adjusted based on the change in the exciting current measured for the excitation phase targeted for excitation. For example, in the examples illustrated in FIG. 8, FIG. 9, and FIG. 10, the length of the second time period may be adjusted to a shorter time period in accordance with the time until the exciting current of the U-V phase converges to 0. By this, it becomes possible to further reduce the time needed in determining the stop position of the rotor 72.

Also, in each of the above-described embodiments, in the determination of the stop position of the rotor 72, it is not necessary to excite all of the excitation phases that the motor 150 has. That is, if the determination can be made based on the obtained result of measuring the exciting current, only some of the six excitation phases that the motor 150 has need be made to the excitation target for determining the stop position of the rotor 72.

Also, the motor control unit 41 of each embodiment described above may be implemented as a motor control apparatus. Alternatively, it is possible to implement, as a motor control apparatus, a part of the motor control unit 41 involved in motor control and a part of the control unit 40 involved in motor control. Also, the present disclosure can be applied to, for example, both a motor for driving each roller in conveyance of a sheet in the image forming apparatus, and a motor for rotationally driving a rotational member in an image formation unit of an image forming apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-111908, filed Jun. 29, 2020, which is hereby incorporated by reference herein in its entirety.

What is claimed is:

1. A motor control apparatus comprising:
  an excitation unit having a plurality of switching elements respectively connected to a power supply and respectively connected to different coils of a motor, wherein the excitation unit is configured to excite an excitation phase targeted for excitation among a plurality of excitation phases of the motor by the plurality of switching elements being driven;
  a measurement unit configured to measure an exciting current, that flows through a coil, of an excitation phase excited by the excitation unit;
  a determination unit configured to determine a stop position of a rotor of the motor, based on a result of measuring the exciting current by the measurement unit obtained by exciting the plurality of excitation phases; and
  a control unit configured to drive a switching element, wherein, when the plurality of excitation phases are excited, the control unit drives, in a first time period and in accordance with a first pulse width modulation (PWM) signal, a first switching element connected to a first phase coil corresponding to a first phase of the excitation phase targeted for excitation and, in a second time period after the first time period and in accordance with a second PWM signal, the control unit drives a second switching element connected to a second phase coil corresponding to a second phase of the excitation phase, and wherein, based on power supplied by the power supply, the control unit controls a duty ratio of the second PWM signal to be outputted to the second switching element in the second time period.

2. The motor control apparatus according to claim 1, wherein the control unit controls the duty ratio of the second PWM signal so that a power according to an exciting current regenerated into the power supply via the second switching element in the second time period falls below the power supplied by the power supply.

3. The motor control apparatus according to claim 1, wherein the control unit controls the duty ratio of the second PWM signal so that a voltage output by the power supply is not caused, by a power accumulated in the power supply according to an exciting current regenerated via the second switching element in the second time period, to change to a voltage outside of a predetermined control range.

4. The motor control apparatus according to claim 1, wherein the control unit controls the duty ratio of the second PWM signal so as to accelerate an attenuation rate of an exciting current that flows through the first phase coil and the second phase coil in the second time period.

5. The motor control apparatus according to claim 1, wherein, in the second time period, the control unit outputs to the second switching element a PWM signal whose duty ratio changes in a pattern that increases with time.

6. The motor control apparatus according to claim 1, wherein the control unit outputs to the second switching element a PWM signal whose duty ratio changes in a pattern that, in the second time period, takes a second value that is larger than a first value initially in the second time period and that gradually increases with time from the first value thereafter.

7. The motor control apparatus according to claim 1, further comprising a storage unit configured to store a pattern indicating a temporal change in a duty ratio of a PWM signal, wherein, in the second time period, the control unit outputs to the second switching element a PWM signal whose duty ratio changes in the pattern stored in the storage unit.

8. The motor control apparatus according to claim 7, wherein the pattern is created in advance based on a measurement result of a change in the supplied power accompanying a change in a load connected to the power supply.

9. The motor control apparatus according to claim 7,
wherein the storage unit is configured to store a plurality of different patterns, and
wherein, based on the power supplied by the power supply, the control unit decides a pattern to use among the plurality of patterns.

10. The motor control apparatus according to claim 1, further comprises a monitor unit configured to monitor the power supplied by the power supply, wherein, in accordance with a change in the supplied power monitored by the monitor unit, the control unit causes the duty ratio of the second PWM signal to be outputted to the second switching element in the second time period to change.

11. The motor control apparatus according to claim 10, wherein, in accordance with an increase in the supplied power, the control unit increases the duty ratio of the second PWM signal to be outputted to the second switching element in the second time period.

12. The motor control apparatus according to claim 1, further comprises a monitor unit configured to monitor a voltage output by the power supply, wherein, in accordance with a detection of a change in the output voltage monitored by the monitor unit, the control unit causes the duty ratio of the second PWM signal outputted to the second switching element in the second time period to change.

13. The motor control apparatus according to claim 12, wherein, in accordance with a detection of a drop in the output voltage monitored by the monitor unit, the control unit increases the duty ratio of the second PWM signal outputted to the second switching element in the second time period.

14. The motor control apparatus according to claim 12, wherein the control unit controls the duty ratio of the second PWM signal outputted to the second switching element in the second time period so that the output voltage being monitored by the monitor unit does not exceed a reference voltage.

15. The motor control apparatus according to claim 1, wherein the control unit further adjusts a length of the second time period in accordance with a change in the exciting current measured by the measurement unit.

16. An image forming apparatus comprising:
a rotational member configured to convey a sheet along a conveyance path;
an image forming unit configured to form an image on the sheet conveyed along the conveyance path;
a drive motor configured to drive the rotational member or the image forming unit; and
a motor control apparatus configured to control the drive motor,
wherein the motor control apparatus includes:
an excitation unit having a plurality of switching elements respectively connected to a power supply and respectively connected to different coils of a motor, wherein the excitation unit is configured to excite an excitation phase targeted for excitation among a plurality of excitation phases of the motor by the plurality of switching elements being driven,
a measurement unit configured to measure an exciting current, that flows through a coil, of an excitation phase excited by the excitation unit,
a determination unit configured to determine a stop position of a rotor of the motor, based on a result of measuring the exciting current by the measurement unit obtained by exciting the plurality of excitation phases, and
a control unit configured to drive a switching element,
wherein, when the plurality of excitation phases are excited, the control unit drives, in a first time period and in accordance with a first pulse width modulation (PWM) signal, a first switching element connected to a first phase coil corresponding to a first phase of the excitation phase targeted for excitation and, in a second time period after the first time period and in accordance with a second PWM signal, the control unit drives a second switching element connected to a second phase coil corresponding to a second phase of the excitation phase, and
wherein, based on power supplied by the power supply, the control unit controls a duty ratio of the second PWM signal to be outputted to the second switching element in the second time period.

\* \* \* \* \*